United States Patent
Song et al.

(10) Patent No.: US 7,864,989 B2
(45) Date of Patent: Jan. 4, 2011

(54) METHOD AND APPARATUS FOR ADAPTIVE CONTEXT-AIDED HUMAN CLASSIFICATION

(75) Inventors: Yang Song, San Jose, CA (US); Thomas Leung, San Jose, CA (US)

(73) Assignee: Fujifilm Corporation, Tokyo (JP)

( * ) Notice: Subject to any disclaimer, the term of this patent is extended or adjusted under 35 U.S.C. 154(b) by 1139 days.

(21) Appl. No.: 11/393,661

(22) Filed: Mar. 31, 2006

(65) Prior Publication Data

US 2007/0237355 A1     Oct. 11, 2007

(51) Int. Cl.
  *G06K 9/00* (2006.01)
  *G06K 9/54* (2006.01)
  *G06K 9/60* (2006.01)
(52) U.S. Cl. .................. 382/116; 382/305; 382/118
(58) Field of Classification Search .............. 382/100, 382/103, 115, 116, 118
  See application file for complete search history.

(56) References Cited

U.S. PATENT DOCUMENTS

| | | | |
|---|---|---|---|
| 5,550,928 | A | 8/1996 | Lu et al. |
| 5,771,307 | A | 6/1998 | Lu et al. |
| 5,802,494 | A | 9/1998 | Kuno |
| 6,246,412 | B1 | 6/2001 | Shum et al. |
| 6,546,185 | B1 | 4/2003 | Kim et al. |
| 6,801,640 | B1 | 10/2004 | Okubo et al. |
| 6,819,783 | B2 | 11/2004 | Goldberg et al. |
| 7,103,225 | B2 * | 9/2006 | Yang et al. .................. 382/225 |
| 7,299,213 | B2 | 11/2007 | Cristianini |
| 7,519,200 | B2 | 4/2009 | Gokturk et al. |
| 2002/0046100 | A1 | 4/2002 | Kinjo |
| 2004/0234108 | A1 | 11/2004 | Li et al. |
| 2005/0260658 | A1 * | 11/2005 | Paladini et al. .................. 435/6 |
| 2006/0018516 | A1 | 1/2006 | Masoud et al. |

(Continued)

OTHER PUBLICATIONS

Zhang et al., Automated Annotation of Human Faces in Family Albums, in MM '03, Nov. 2-8, 2003, pp. 1-4.*

(Continued)

*Primary Examiner*—Tom Y Lu
*Assistant Examiner*—Thomas A Conway
(74) *Attorney, Agent, or Firm*—Birch, Stewart, Kolasch & Birch, LLP

(57) ABSTRACT

A method and an apparatus process digital images. The method according to one embodiment accesses digital data representing a plurality of digital images including a plurality of persons; performs face recognition to determine first scores relating to similarity between faces of the plurality of persons; performs clothes recognition to determine second scores relating to similarity between clothes of the plurality of persons; provides a plurality of formulas for estimating a probability of a face from the faces and a clothes from the clothes to belong to a person from the plurality of persons, wherein at least one formula of the plurality of formulas utilizes a first score and a second score, and at least one formula of the plurality of formulas utilizes only one score of a first score and a second score; and selects a formula from the plurality of formulas based on availability of a first score from the first scores for two persons from the plurality of persons, and availability of a second score from the second scores for the two persons, the selected formula estimating a probability relating to similarity of identities of the two persons.

40 Claims, 9 Drawing Sheets

U.S. PATENT DOCUMENTS

2006/0120569 A1  6/2006  Kim et al.
2006/0251292 A1* 11/2006 Gokturk et al. ............. 382/103
2007/0237355 A1 10/2007 Song et al.

OTHER PUBLICATIONS

Sivic et al., Video Google: A Text Retrieval Approach to Object Matching in Videos, Proceedings of the 9th IEEE Int'l conf. on Computer Vision, 2003, pp. 1-8.*

Rapid Object Detection using a Boosted Cascade of Simple Features, Paul Viola et al., Accepted Conference on Computer Vision and Pattern Recognition, 2001.

Red Eye Detection with Machine Learning, Sergey Ioffe, in Proc. ICIP, 2003.

Constrained K-means Clustering with Background Knowledge, Kiri Wagstaff et al., Proceedings of the Eighteenth International Conference of Machine Learning, 2001, pp. 577-584.

On Spectral Clustering: Analysis and an algorithm, Andrew Y. Ng et al., in NIPS 14, 2002.

Segmentation using eigenvectors: a unifying view, Yair Weiss, UC Berkeley, Berkeley, California, in Proc. ICCV, 1999.

Normalized Cuts and Image Segmentation, Jianbo Shi et al., in Proc. *CVPR*, IEEE, pp. 731-737, Jun. 1997.

Automated Annotation of Human Faces in Family Albums, Lei Zhang et al., in MM '03, Nov. 2-8, 2003.

Grouping with Bias, Stella X. Yu et al., Robotics Institute, Carnegie Mellon University, Pittsburgh, Pennsylvania, in NIPS, 2001.

Texton Correlation for Recognition, Thomas Leung, Fujifilm Software, San Jose, CA, In Proc. European Conference Computer Vision, 2004, pp. 203-214.

Hierarchical mixtures of experts and the EM algorithm, Michael I. Jordan et al., Neural Computation, 6:181-214, 1994.

A Statistical Method for 3D Object Detection Applied to Faces and Cars, Henry Schneiderman et al., In Proc. CVPR, 2000.

Video Google: A Text Retrieval Approach to Object Matching in Videos, Josef Sivic et al., Proceedings of the Ninth IEEE International Conference on Computer Vision, 2003.

Computational Models of Perceptual Organization, Stella X. Yu, Ph.d. Thesis, Carnegie Mellon University, Pittsburgh, Pennsylvania, May 2003, pp. 1-159.

* cited by examiner

METHOD AND APPARATUS FOR ADAPTIVE CONTEXT-AIDED HUMAN CLASSIFICATION

CROSS REFERENCE TO RELATED APPLICATIONS

This non-provisional application is related to co-pending non-provisional applications titled "Method and Apparatus for Context-Aided Human Identification" and "Method and Apparatus for Performing Constrained Spectral Clustering of Digital Image Data" filed concurrently herewith, the entire contents of which are hereby incorporated by reference.

BACKGROUND OF THE INVENTION

1. Field of the Invention

The present invention relates to a classification technique, and more particularly to a method and apparatus for classifying digital images of objects, such as people.

2. Description of the Related Art

Identification and classification of objects in images is an important application useful in many fields. For example, identification and classification of people in images is important and useful for automatic organization and retrieval of images in photo albums, for security applications, etc. Face recognition has been used to identify people in photographs and digital image data.

Reliable face recognition, however, is difficult to achieve because of variations in image conditions and human imaging. Such variations include: 1) lighting variations, such as indoors vs. outdoor illuminations or back-lit vs. front lit images of people; 2) pose changes, such as frontal view vs. side view of people; 3) poor image quality, such as face out of focus or motion blur in images; 4) different facial expressions, such as open eyes vs. closed eyes, open mouth vs. closed mouth, etc; 5) aging of people; etc.

A few publications have studied human recognition techniques in images. One such technique is described in "Automated Annotation of Human Faces in Family Albums", by L. Zhang, L. Chen, M. Li, and H. Zhang, in Proc. ACM Multimedia, MM'03, Berkeley, Calif., USA, Nov. 2-8, 2003, which discloses human identification methods. In this publication, facial features and contextual features are used to characterize people in images. In this human identification method, however, the facial features and the contextual features of people are assumed to be independent. This is not an accurate assumption and hampers the effectiveness of using facial features and contextual features to characterize people. Also, integration of facial features and contextual features encounters challenges when any of these features are unreliable or unavailable.

Disclosed embodiments of this application address issues associated with human recognition and classification, by using an adaptive context-aided human classification method and apparatus that can identify people in images when some features of the people in images are unavailable. The method and apparatus perform a principled integration of face and clothes recognition data. The method and apparatus select formulas to combine face and clothes recognition data and obtain overall recognition results for use in the classification of people in images. The formulas are selected depending on the availability of data relating to faces and clothes of people in the images.

SUMMARY OF THE INVENTION

The present invention is directed to a method and an apparatus that process digital images. According to a first aspect of the present invention, a digital image processing method comprises: accessing digital data representing a plurality of digital images including a plurality of persons; performing face recognition to determine first scores relating to similarity between faces of the plurality of persons; performing clothes recognition to determine second scores relating to similarity between clothes of the plurality of persons; providing a plurality of formulas for estimating a probability of a face from the faces and a clothes from the clothes to belong to a person from the plurality of persons, wherein at least one formula of the plurality of formulas utilizes a first score and a second score, and at least one formula of the plurality of formulas utilizes only one score of a first score and a second score; and selecting a formula from the plurality of formulas based on availability of a first score from the first scores for two persons from the plurality of persons, and availability of a second score from the second scores for the two persons, the selected formula estimating a probability relating to similarity of identities of the two persons.

According to a second aspect of the present invention, a digital image processing apparatus comprises: an image data unit for providing digital data representing a plurality of digital images including a plurality of persons; a face recognition unit for determining first scores relating to similarity between faces of the plurality of persons; a clothes recognition unit for determining second scores relating to similarity between clothes of the plurality of persons; and a formula selection unit for providing a plurality of formulas to estimate a probability of a face from the faces and a clothes from the clothes to belong to a person from the plurality of persons, wherein at least one formula of the plurality of formulas utilizes a first score and a second score, and at least one formula of the plurality of formulas utilizes only one score of a first score and a second score, and selecting a formula from the plurality of formulas based on availability of a first score from the first scores for two persons from the plurality of persons, and availability of a second score from the second scores for the two persons, the selected formula estimating a probability relating to similarity of identities of the two persons.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
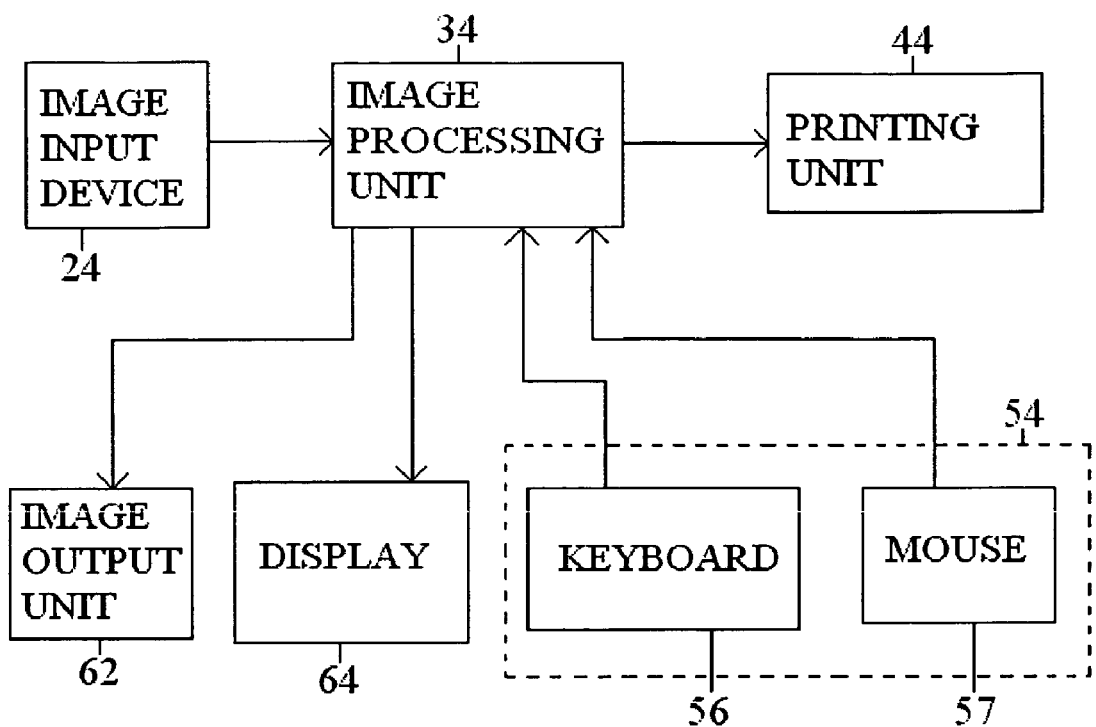
FIG. 1 is a general block diagram of a system including an image processing unit for adaptive context-aided human classification in digital image data according to an embodiment of the present invention.

Aspects of the invention are more specifically set forth in the accompanying description with reference to the appended figures. FIG. 1 is a general block diagram of a system including an image processing unit for adaptive context-aided human classification in digital image data according to an embodiment of the present invention. The system 104 illustrated in FIG. 1 includes the following components: an image input device 24; an image processing unit 34; a display 64; a user input unit 54; an image output unit 62; and a printing unit 44. Operation of the system 104 in FIG. 1 will become apparent from the following discussion.

The image input device 24 provides image data to image processing unit 34. Image data can be digital images. Examples of digital images that can be input by image input device 24 are photographs of people in everyday activities, photographs of people taken for security or identification purposes, etc. Image input device 24 may be one or more of any number of devices providing digital image data. Image input device 24 could provide digital image data derived from a database of images, a digital system, etc. Image input device 24 may be a scanner for scanning black and white or color images recorded on film; a digital camera; a recording medium such as a CD-R, a floppy disk, a USB drive, etc.; a database system which stores images; a network connection; an image processing system that outputs digital data, such as a computer application that processes images; etc.

The image processing unit 34 receives image data from the image input device 24, and performs adaptive context-aided human classification of the people in the digital image data, in a manner discussed in detail below. A user may view outputs of image processing unit 34, including intermediate results of adaptive context-aided human classification of people in digital image data, via display 64, and may input commands to the image processing unit 34 via the user input unit 54. In the embodiment illustrated in FIG. 1, the user input unit 54 includes a keyboard 56 and a mouse 57, but other conventional input devices could also be used.

In addition to performing adaptive context-aided human classification of people in digital image data in accordance with embodiments of the present invention, the image processing unit 34 may perform additional image processing functions, such as known color/density correction functions, as well as image cropping, compression, etc. in accordance with commands received from the user input unit 54. The printing unit 44 receives the output of the image processing unit 34 and generates a hard copy of the processed image data. The printing unit 44 may expose a light-sensitive material according to image data output by the image processing unit 34 to record an image on the light-sensitive material. The printing unit 44 may take on other forms, such as a color laser printer. In addition to or as an alternative to generating a hard copy of the output of the image processing unit 34, the processed image data may be returned to the user as a file, e.g., via a portable recording medium or via a network (not shown). The display 64 receives the output of the image processing unit 34 and displays image data together with classification results of people in the image data. The output of the image processing unit 34 may also be sent to image output unit 62. Image output unit 62 can be a database that stores image classification results received from image processing unit 34.

Figure 2:
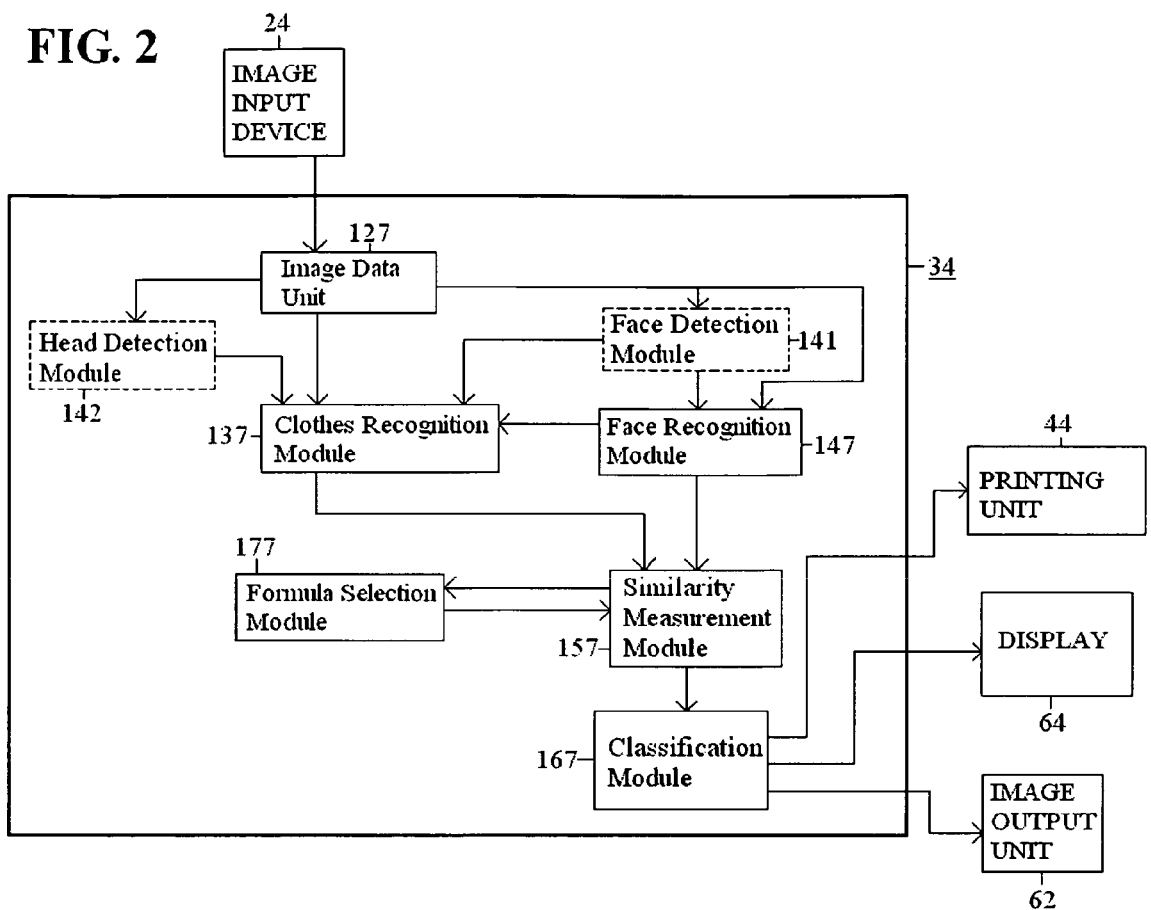
FIG. 2 is a block diagram illustrating in more detail aspects of an image processing unit for adaptive context-aided human classification in digital image data according to an embodiment of the present invention.

FIG. 2 is a block diagram illustrating in more detail aspects of an image processing unit 34 for adaptive context-aided human classification in digital image data according to an embodiment of the present invention. As shown in FIG. 2, image processing unit 34 according to this embodiment includes: an image data unit 127; a clothes recognition module 137; a face recognition module 147; a similarity measurement module 157; a formula selection module 177; a classification module 167; an optional face detection module 141; and an optional head detection module 142. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 34 illustrated in FIG. 2 inputs a set of images from image input device 24, performs recognition of clothes and faces in the images from the set of images, selects formulas for combining results of clothes recognition and face recognition for images in the set of images, determines similarity measurements for people in the set of images, and classifies images according to identities of people shown in the images. Classification module 167 outputs classification results for images based on identities of people shown in the images. Such classification results may be output to printing unit 44, display 64 and/or image output unit 62. Image data unit 127 may also perform preprocessing and preparation operations on images before sending them to clothes recognition module 137, face recognition module 147, optional face detection module 141, and optional head detection module 142. Preprocessing and preparation operations performed on images may include resizing, cropping, compression, color correction, etc., that change size, color, appearance of the images, etc.

Face detection determines locations and sizes of faces in a set of images. Face recognition determines the identities of detected faces with known locations and sizes. Hence, face recognition is typically performed after face detection. Face detection is performed by the optional face detection module 141, when the module is present. Face detection may also be performed by face recognition module 147, when the face recognition module 147 includes a sub-module for face detection. Hence, in this case, performing face recognition includes performing face detection. Clothes recognition module 137 may communicate with face recognition module 147 or with optional face detection module 141 to obtain results of face detection. Alternatively, clothes recognition module 137 may obtain results of head detection from optional head detection module 142.

Clothes recognition module 137, face recognition module 147, similarity measurement module 157, formula selection module 177, classification module 167, optional face detection module 141, and optional head detection module 142 are software systems/applications in an exemplary implementation. Operation of the components included in the image processing unit 34 illustrated in FIG. 2 will be next described with reference to FIGS. 3-9.

Automatic organization of photographs is an important application with many potential uses such as photo album organization and security applications. Human classification techniques that integrate face information with clothes information, picture record data, and other context cues, and organize pictures according to one or more persons' identities, are implemented in the current application. Using face information, clothes information, and other context cues, similarities between persons in the pictures are evaluated. The persons in the pictures are then placed into groups based on the persons' identities. Hence all the images of the same individual are placed in one group, while images from other individuals are placed in other groups.

A classification method and apparatus that classify images based on people's identities can use face recognition as well as other cues in images. Information besides faces information is called 'context' information in the current application, and can provide rich cues for recognizing people. Three types of context information are typically present in images. The first type of context information is appearance-based, such as the clothes a person is wearing; the second type of context information is logic-based, and can be expressed, for example, by the fact that different faces in one picture belong to different persons, or by the fact that some people are more likely to be pictured together (e.g. husband and wife); the third type of context information is meta-data of pictures such as the picture-taken-time. These three types of context information are often used by human observers consciously or unconsciously to differentiate between people in pictures. A classification method that can utilize context information effectively can improve human recognition accuracy.

The method and apparatus presented in this application automatically organize pictures according to persons' identities by using faces and as much context information as possible. Using the method described in the current application improves upon results from a face recognition engine by using context information.

The phrases "person image", "people images", or "person images" are used interchangeably in the current application to refer to images of people inside an image. Hence, an image that shows three people contains three person images, while an image that shows one person contains one person image.

Figure 3:
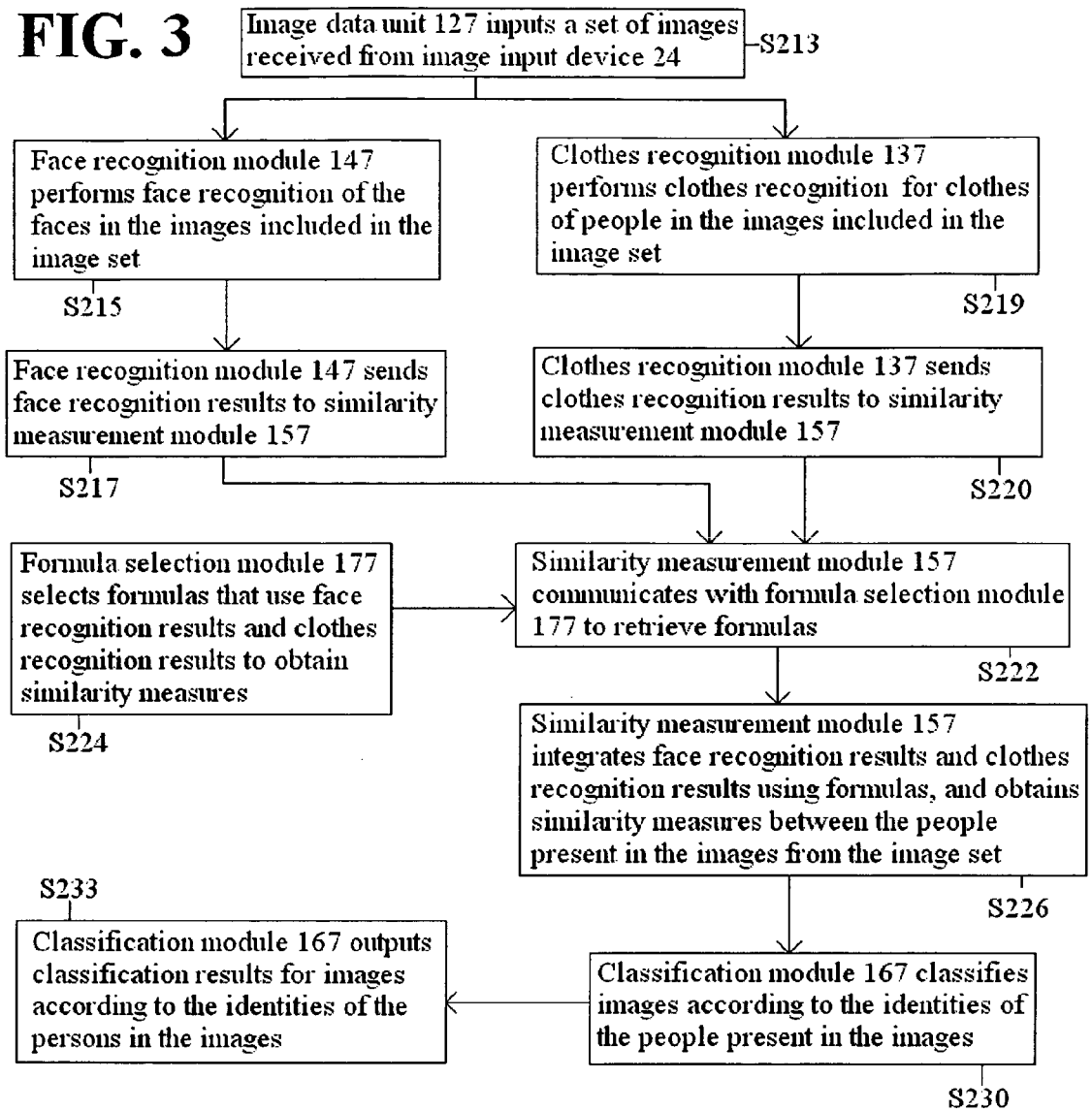
FIG. 3 is a flow diagram illustrating operations performed by an image processing unit for adaptive context-aided human classification in digital image data according to an embodiment of the present invention illustrated in FIG. 2.

FIG. 3 is a flow diagram illustrating operations performed by an image processing unit 34 for adaptive context-aided human classification in digital image data according to an embodiment of the present invention illustrated in FIG. 2. Image data unit 127 inputs a set of images received from image input device 24 (S213). The images may be pictures of people taken under different poses, at different times of day, in different days, and in different environments.

Face recognition module 147 receives the set of images and performs face recognition of the faces in the images included in the image set (S215). Face recognition is used to obtain face information that is associated with the identities of faces. Face recognition module 147 may perform face recognition and obtain face recognition results using methods described in the publication "Texton Correlation for Recognition", by T. Leung, in Proc. European Conference Computer Vision, ECCV 2004, pp. 203-214, which is herein incorporated by reference. In "Texton Correlation for Recognition" faces are represented using local characteristic features called textons, so that face appearance variations due to changing conditions are encoded by the correlations between the textons. The correlations between the textons contain face information associated with the identities of faces. Two methods can be used to model texton correlations. One method is a conditional texton distribution model and assumes locational independence. The second method uses Fisher linear discriminant analysis to obtain second order variations across locations. The texton models can be used for face recognition in images across wide ranges of illuminations, poses, and time. Other face recognition techniques may also be used by face recognition module 147.

Face recognition module 147 outputs face recognition results to similarity measurement module 157 (S217). Face recognition module 147 may output face recognition results in the form of scores relating to similarities between faces of people. Such scores may measure similarities between faces in face pairs and indicate correlations between two faces from the same or different images. If two faces from different images belong to the same person, the two faces would exhibit a high correlation. On the other hand, if two faces from different images belong to different people, the two faces would exhibit a low correlation.

Clothes recognition module 137 receives the set of images from image data unit 127 as well, performs clothes recognition, and obtains clothes recognition results for clothes of people in the images included in the image set (S219). Clothes recognition results may be similarity scores between clothes of people in the images included in the image set. Clothes, as referred to in the current invention, include actual clothes as well as other external objects associated with people in images. In the current application, the term "clothes" refers to actual clothes, as well as hats, shoes, watches, eyeglasses, etc., as all these objects can be useful in discriminating between different people. Clothes recognition module 137 outputs clothes recognition results to similarity measurement module 157 (S220).

Clothes recognition results in the form of clothes similarity scores measure the degree of similarity between clothes of different people. For example, when a person appears in two images wearing the same clothes, a score associated with the clothes of that person from the two different images indicates that the clothes are similar. Clothes recognition module 137 may perform clothes recognition to obtain clothes recognition results and clothes similarity scores using methods described in the cross-referenced related US application titled "Method and Apparatus for Context-Aided Human Identification", the entire contents of which are hereby incorporated by reference.

Similarity measurement module 157 receives face recognition results from face recognition module 147 and clothes recognition results from clothes recognition module 137. Similarity measurement module 157 then communicates with formula selection module 177 to retrieve formulas that determine similarity measures between people images in the set of images (S222). Formula selection module 177 uses context information of images from the set of images, and selects formulas that use face recognition results and clothes recognition results to obtain similarity measures (S224). Formula selection module 177 selects formulas depending on availability and usability of face recognition results and clothes recognition results for people in the images from the set of images. Upon receiving appropriate formulas from formula selection module 177, similarity measurement module 157 integrates face recognition results and clothes recognition results to obtain similarity measures between the people present in the images (S226). Combined similarity measures integrating both face recognition results and clothes recognition results implement a more robust method for determining whether two people from different images are the same person or not.

Classification module 167 receives from similarity measurement module 157 similarity measures between people in the images from the set of images. Based on similarity measures, classification module 167 classifies images according to the identities of the people present in the images (S230). Classification module 167 may perform classification of images using clustering techniques described in the cross-referenced related US application titled "Method and Apparatus for Performing Constrained Spectral Clustering of Digital Image Data", the entire contents of which are hereby incorporated by reference. Classification module 167 then outputs classification results for images from the set of images (S233). Such classification results may be output to printing unit 44, display 64, and/or image output unit 62.

Figure 4:
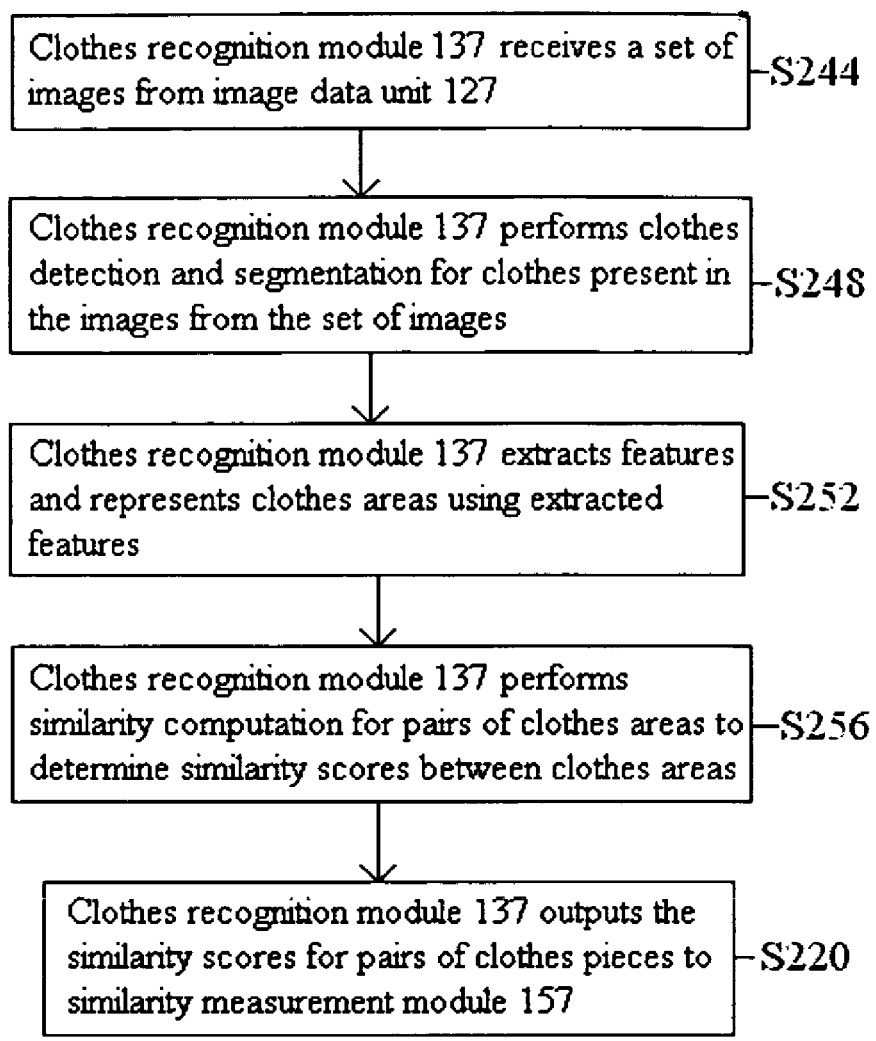
FIG. 4 is a flow diagram illustrating a technique for performing clothes recognition to obtain clothes recognition results for clothes in digital image data according to an embodiment of the present invention.

FIG. 4 is a flow diagram illustrating a technique for performing clothes recognition to obtain clothes recognition results for clothes in digital image data according to an embodiment of the present invention. The technique described in FIG. 4 may be used by clothes recognition module 137 to obtain clothes recognition results in the form of similarity scores for clothes in images in step S219 of FIG. 3.

Clothes recognition identifies clothes pieces in images, determines how similar clothes pieces are to each other, and hence indicates how likely it is that two clothes pieces from two person images actually belong to the same individual. There are three steps included in the clothes recognition method: clothes detection and segmentation, clothes representation by feature extraction, and similarity computation based on extracted features.

Clothes recognition module 137 receives a set of images from image data unit 127 (S244). Clothes recognition module 137 then performs detection and segmentation of clothes present in the images (S248). Clothes detection and segmentation includes an initial estimation of clothes location to detect initial clothes areas, segmentation of initial clothes areas in images to obtain refined clothes areas, and removal of clutters from the refined clothes areas. An initial estimation of clothes location is obtained from face detection, by using results of face detection from face recognition module 147, or from optional face detection module 141 if present. Face recognition module 147 and optional face detection module 141 may perform face detection using one or more of the methods described in the following publications which are herein incorporated by reference: "Red Eye Detection with Machine Learning", by S. Ioffe, in Proc. ICIP, 2003, "A Statistical Method for 3D Object Detection Applied to Faces and Cars", by H. Schneiderman and T. Kanade, in Proc. CVPR, 2000, and "Rapid Object Detection Using a Boosted Cascade of Simple Features", by P. Viola and M. Jones, in Proc. CVPR, 2001. An initial estimation of clothes location can also be obtained from results of head detection from optional head detection module 142. Head detection may be performed using methods similar to the methods described in the above publications. Other methods may also be used to perform head detection.

Clutters represent image areas that are not actually part of clothes areas, but are mixed or intermixed with clothes areas. Clutters include skin areas, such as the skin of the people wearing the clothes, occluding objects such as an object located in front of a person and occluding part of the person's clothes, etc. Clothes recognition module 137 next extracts features and represents clothes areas using the extracted features to obtain numerical representations for clothes areas (S252). The numerical representations of clothes areas generated by clothes recognition module 137 permit manipulation of the clothes areas for further analysis. Representative areas, or code-words, for clothes areas are extracted, and feature vectors are generated from frequencies of appearance of code-words in clothes areas. The feature vectors provide a numerical representation of clothes areas. Clothes recognition module 137 finally performs a similarity computation, to determine similarity scores between clothes areas (S256). The similarity score of two pieces of clothes is computed as the normalized scalar product of weighted code-word frequency vectors of the two pieces of clothes. Clothes recognition module 137 then outputs the similarity scores for pairs of clothes pieces to similarity measurement module 157 (S220). Additional details on how steps S248, S252, and S256 are performed can be found in the cross-referenced related US application titled "Method and Apparatus for Context-Aided Human Identification", the entire contents of which are hereby incorporated by reference.

Figure 5:
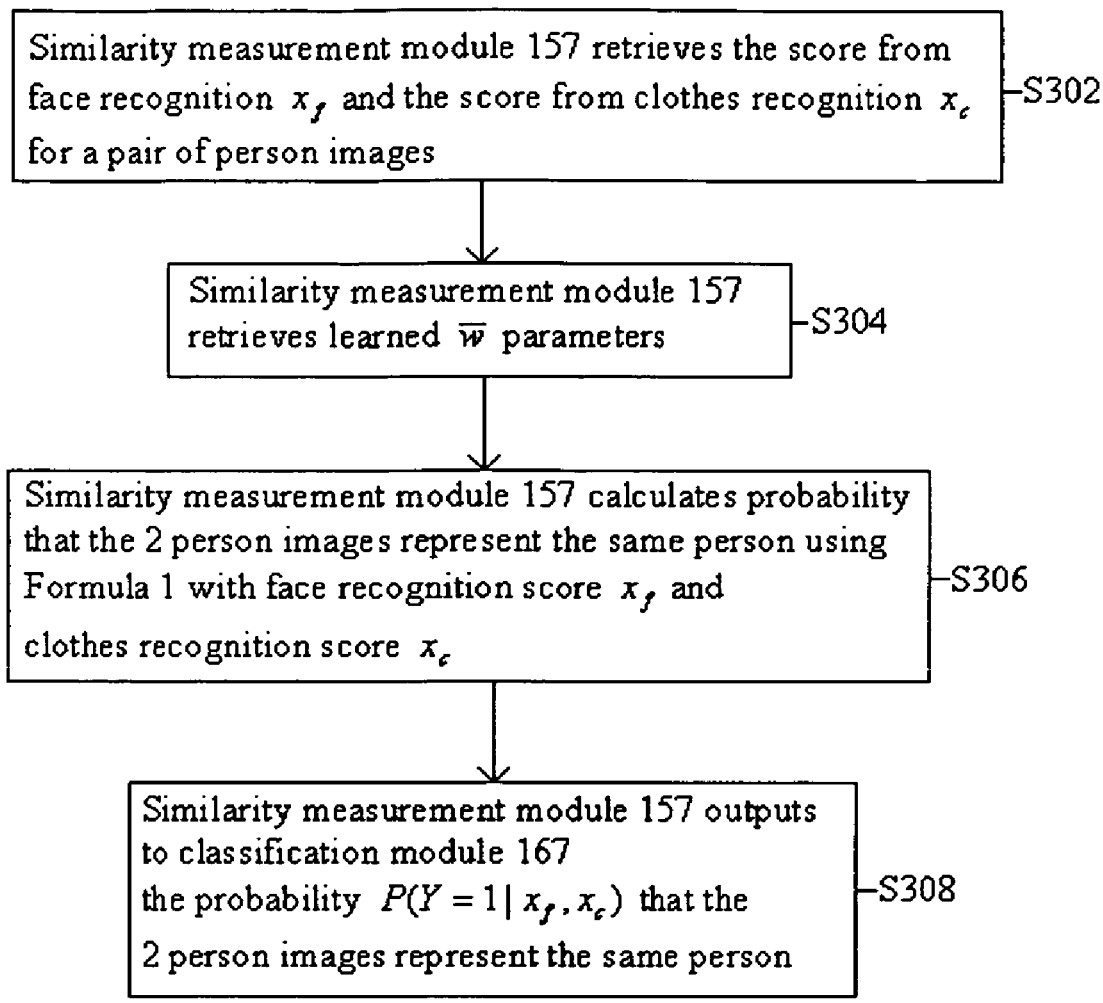
FIG. 5 is a flow diagram illustrating a technique for combining face and clothes recognition results to obtain similarity measures for two person images using both face recognition results and clothes recognition results according to an embodiment of the present invention.

FIG. 5 is a flow diagram illustrating a technique for combining face and clothes recognition results to obtain similarity measures for two person images according to an embodiment of the present invention. The technique described in FIG. 5 can be used by similarity measurement module 157 to obtain similarity measures between person images during operation step S226 of FIG. 3.

Linear logistic regression is used to combine face and clothes recognition results to obtain similarity measures between person images. Clothes information is complimentary to faces information and is very useful when the face position and/or face angle changes as is the case with profile faces, when the quality of the face image is poor, or when facial expression variations occur in images. Hence, more powerful results for identity recognition of people in images are achieved when face and clothes cues are integrated, than when face cues alone are used. Similarity measurement module 157 integrates clothes context with face recognition. The similarity scores obtained from clothes recognition by clothes recognition module 137 indicate how similar two clothes pieces are. To achieve higher accuracy of human recognition for the images in the set of images, clothes cues are integrated with face cues. The combination of clothes cues with face cues provides similarity measurements that are later used for classification of images based on the identities of the people present in the images.

Mathematically, the cue combination problem can be described as follows. For any pair of person images, let $x_f$ be the face recognition score from face recognition measuring similarity between faces of two persons appearing in person images, and $x_c$ be the clothes recognition score from clothes recognition measuring similarity between the clothes of the two persons. Let random variable Y indicate whether the pair of persons is the same person or not. Hence, Y=1 means that the two persons represent the same person, and Y=0 means otherwise. The problem of cue combination can be solved by finding a function $f(x_f, x_c)$ such that the probability $P(Y=1|x_f, x_c) = \theta(x_f, x_c)$ is a good indicator of whether the pair of person images represent the same person or not.

For a pair of person images, one person image showing a person A and the other person image showing a person B, similarity measurement module 157 retrieves the score from face recognition $x_f$ and the score from clothes recognition $x_c$ (S302). $x_f$ measures the similarity between the faces of persons A and B, as determined by face recognition module 147. Face recognition module 147 may extract scores $x_f$ between faces using methods described in "Texton Correlation for Recognition", by T. Leung, in *Proc. European Conference Computer Vision, ECCV* 2004, pp. 203-214, which is herein incorporated by reference. $x_c$ is the similarity score between the clothes of person A and the clothes of person B, obtained by the clothes recognition module 137. Clothes recognition module 137 may extract similarity scores $x_c$ between clothes pieces of two persons using methods described in the cross-referenced related US application titled "Method and Apparatus for Context-Aided Human Identification", the entire contents of which are hereby incorporated by reference.

Let random variable Y indicate whether the person images in the pair are from the same person or not. Hence, Y=1 means that the images are of the same person and Y=0 means otherwise. Similarity measurement module 157 estimates the probability $P(Y=1|x_f,x_c)$ for the pair of person images to belong to the same individual given face score $x_f$ and clothes scores $x_c$. By linear logistic regression, Formula 1 is obtained:

Formula 1

$$P(Y=1|x_f, x_c) = \frac{1}{1+\exp(-w_f x_f - w_c x_c - w_0)} \quad (1)$$

where $\overline{w}=[w_f, w_c, w_0]$ are parameters that are learned. The $\overline{w}$ parameters are learned by similarity measurement module 157 previously, from a set of training images. The $\overline{w}$ that maximizes the log-likelihood of a set of training example images, can be obtained iteratively using Newton-Raphson's method. The $\overline{w}$ obtained is retrieved for use in Formula 1 (S304).

The pair of face recognition and clothes recognition scores $x_f$ and $x_c$ are plugged into equation (1), and $P(Y=1|x_f,x_c)$ is obtained (S306). $P(Y=1|x_f,x_c)$ is the probability that the person images associated with scores $x_f$ and $x_c$ are from the same person. The probability $P(Y=1|x_f,x_c)$ associated with a pair of person images is the similarity measure for the pair of person images, and is output to classification module 167 (S308).

Figure 6:
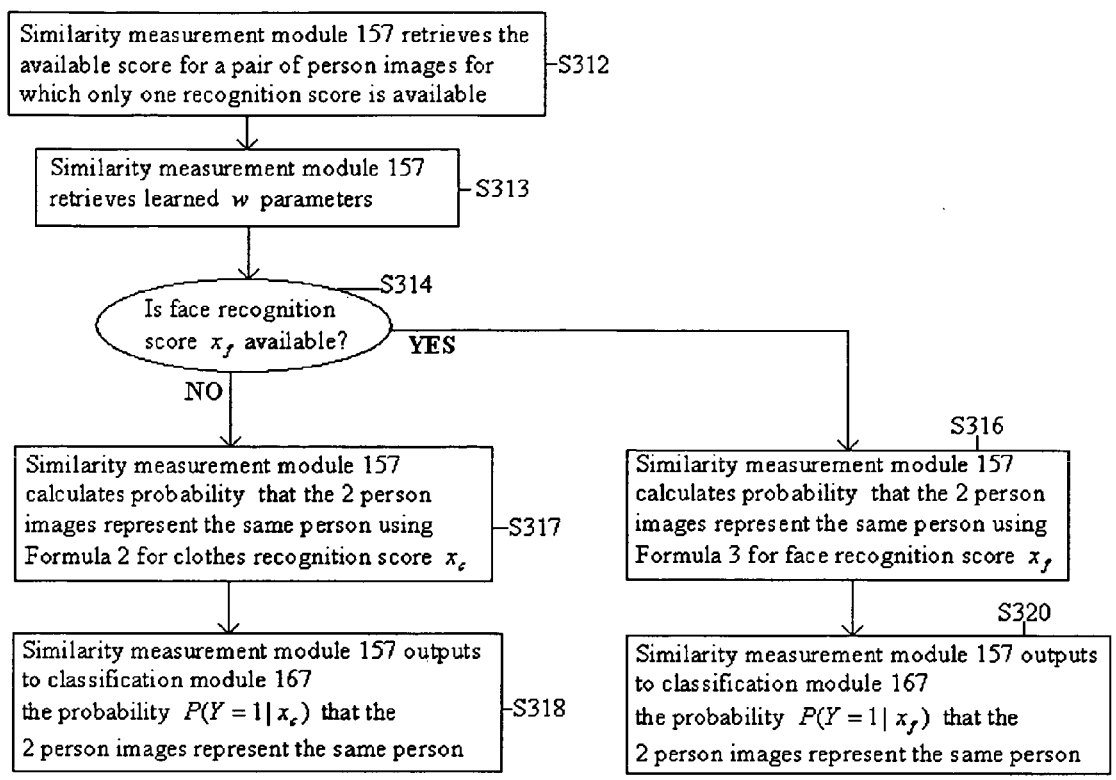
FIG. 6 is a flow diagram illustrating a technique for obtaining face similarity measures for two person images when face recognition results or clothes recognition results are missing according to an embodiment of the present invention.

FIG. 6 is a flow diagram illustrating a technique for obtaining similarity measures for two person images when face recognition results or clothes recognition results are missing according to an embodiment of the present invention. The technique described in FIG. 6 can be used by similarity measurement module 157 to obtain similarity measures between person images during operation step S226 of FIG. 3. Linear logistic regression provides a good way to handle cases when face or clothes information is missing. Face recognition results may be unavailable when, for example, faces are occluded or only the back view of heads is present, or when only profile faces are present which makes face recognition difficult. While one advantage of using clothes context is to help improve human recognition accuracy, another advantage is that it makes human recognition possible when face recognition results are unavailable.

Clothes recognition results can also be missing due to occlusion of clothes. Clothes recognition results can become unreliable for images taken on different days (events) or when different people in the same picture are wearing the same clothes.

The similarity measurements under all the situations (with face recognition results only, clothes recognition results only, and with face and clothes recognition results combined) need to be compatible, so that the measurements can be compared directly and fairly. To handle the case of face or clothes information missing, linear logistic regression is used again.

Notations similar to notations in FIG. 5 are used. For a pair of person images including a person A and a person B for which only one score is available, similarity measurement module 157 retrieves the available score: the score from face recognition $x_f$ or the score from clothes recognition $x_c$ (S312).

When the face recognition score $x_f$ is missing for a pair of person images, while clothes similarity score $x_c$ is available, $P(Y=1|x_c)$ is computed (S317). On the other hand, when clothes recognition score $x_c$ is missing for a pair of person images, while face score $x_f$ is available, $P(Y=1|x_f)$ is computed (S316). Y=1 denotes that two images belong to the same individual, and Y=0 denotes otherwise. The probability $P(Y=1|x_f,x_c)$, which is the probability of the pair of person images representing the same individual when both face and clothes recognition scores are available, cannot be computed for the case illustrated in FIG. 6, since either the face recognition score $x_f$ or the clothes similarity score $x_c$ is missing.

Probabilities $P(Y=1|x_f,x_c)$, $P(Y=1|x_f)$, and $P(Y=1|x_c)$ are compatible. Compatibility is assured between the situation with one score missing shown in FIG. 6 and the situation shown in FIG. 5 where both scores are available, if $P(Y=1|x_c)$ and $P(Y=1|x_f)$ are the marginal probabilities of $P(Y=1|x_f,x_c)$ and hence can be compared directly.

Since $$P(Y=1|x_f, x_c) = \frac{1}{1+\exp(-w_f x_f - w_c x_c - w_0)}$$

from equation (1), by Bayesian rule, $P(Y=1|x_c)$ can be computed as:

$$P(Y=1|x_c) = \int_{x_f} P(Y=1|x_f, x_c) P(x_f|x_c) dx_f$$

$$= \int_{x_f} \frac{1}{1+\exp(-w_f x_f - w_c x_c - w_0)} P(x_f|x_c) dx_f$$

If we assume that $x_f = C \cdot x_c + C_0$ for some constants C and $C_0$, i.e., $P(x_f|x_c) = \delta(x_f - C \cdot x_c - C_0)$, then the probability of two clothes pieces with clothes similarity score $x_c$ belonging to the same person is given by Formula 2:

Formula 2

$$P(Y=1|x_c) = \frac{1}{1+\exp(-w_f \cdot C \cdot x_c - w_f \cdot C_0 - w_c x_c - w_0)}. \quad (2)$$

$$= \frac{1}{1+\exp(-w'_c x_c - w'_0)}$$

The assumption that $x_f = C \cdot x_c + C_0$ applies when face information is missing, as in that case only the clothes information determines the similarity between a pair of person images. From Formula 2, $P(Y=1|x_c)$ is also in the form of a logistic function, for the case when $x_f$ is not available. $P(Y=1|x_f)$ can be similarly expressed in the form of a logistic function using Formula 3, when face scores are available but clothes scores $x_c$ are not available:

Formula 3

$$P(Y=1|x_f) = \frac{1}{1+\exp(-w''_f x_f - w''_0)} \quad (3)$$

The parameters of the logistic functions such as $w'_c$, $w'_0$, $w''_f$, and $w''_0$ in Formulas 2 and 3 can be estimated by linear logistic regression in a similar fashion to the estimation used for the $\overline{w}$ parameters of Formula 1. The parameters $w'_c$, $w'_0$, $w''_f$ and $w''_c$ can be learned by similarity measurement module 157 previously, from a set of training images. The probability $P(Y=1|x_c)$ or $P(Y=1|x_f)$ associated with the pair of person images is then output to classification module 167 (S318, S320). Being able to handle the cases when face or clothes information is missing makes the algorithm effective when the clothes are occluded (only face recognition available) or on profile faces when only clothes recognition results are available.

Formula 2 is derived assuming that face scores are a linear function of clothes scores so that only clothes information determines the similarity between a pair of person images. This is a reasonable assumption when face information missing. The validity of this assumption and the compatibility of computed $P(Y=1|x_f,x_c)$, $P(Y=1|x_f)$ and $P(Y=1|x_c)$ were tested in experiments and the assumption was found to be valid.

The case of people wearing the same (or similar) clothes poses difficulties for incorporation of clothes information into calculation of probabilities. Two persons P5 and P6 in a picture C usually are not the same individual. Therefore if in a picture C two persons P5 and P6 wear the same (or similar) clothes, the clothes information for P5 and P6 (i.e., the clothes similarity score $x_c$) needs to be discarded as it provides misleading or no information. The similarity probability between people P5 and P6 is then computed using only the face score $x_f$, by Formula 3 for $P(Y=1|x_f)$.

Figure 7:
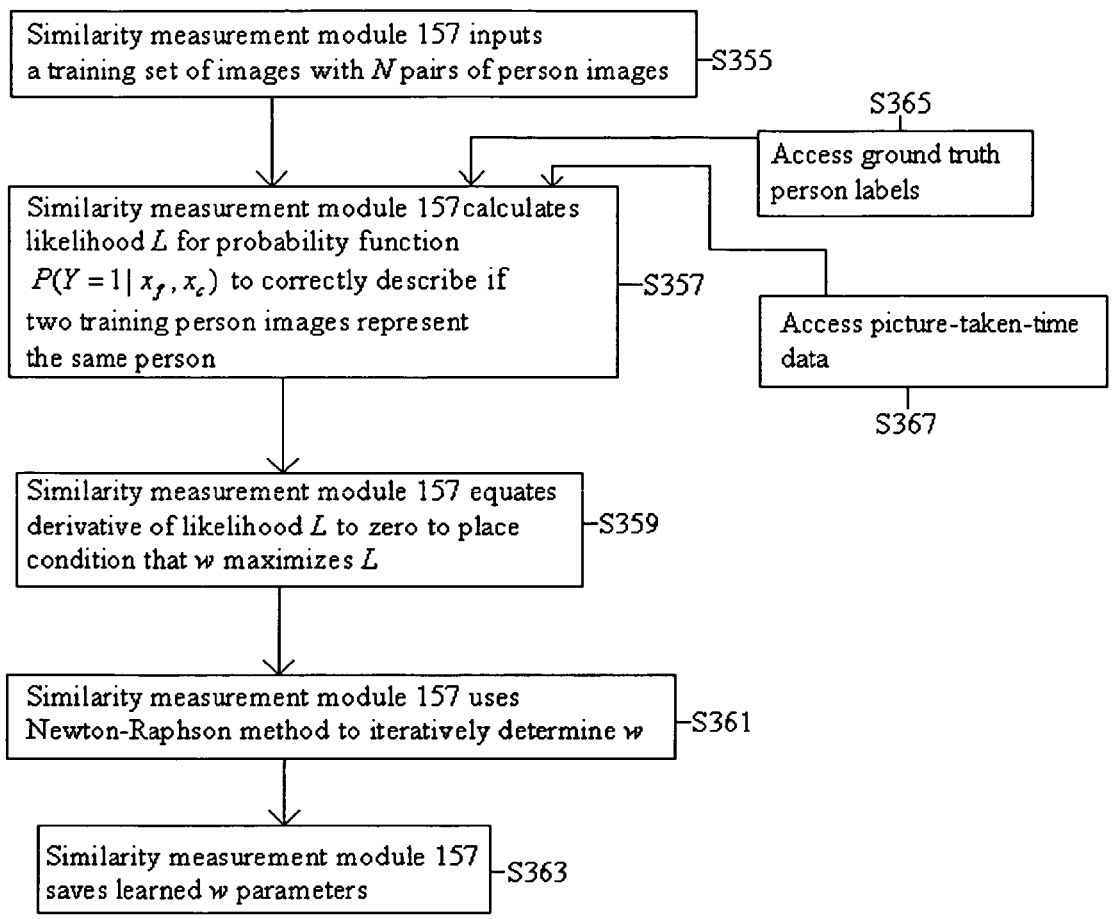
FIG. 7 is a flow diagram illustrating a technique for learning parameters to be used in calculation of similarity measures between people according to an embodiment of the present invention.

FIG. 7 is a flow diagram illustrating a technique for learning parameters to be used in calculation of similarity measures between people according to an embodiment of the present invention. The parameter learning technique described in FIG. 7 is used to generate the parameters $\overline{w}$ used by similarity measurement module 157 in step S304 in FIG. 5, or the parameters w in step S313 in FIG. 6.

In the linear logistic regression method, the function $f(x_f, x_c)$ is determined, such that the probability $P(Y=1|x_f,x_c)=f(x_f,x_c)$ is a good indicator of whether the pair of person images associated with $x_c$ and $x_f$ represent the same person or not. The function $f$ is of the form:

$$P(Y=1|\overline{x}) = f(\overline{x}) = \frac{1}{1+\exp(-w\overline{x})} \quad (4)$$

where $\overline{x}=[x_1,x_2,1]^T$ with $x_1=x_f$ and $x_2=x_c$, and $w=[w_1,w_2,w_0]$ is a 3-dimensional vector with parameters determined by learning from a training set of images.

The training set of images contains pairs of person images coming either from the same person or from different people. Face recognition scores and clothes recognition scores are extracted for the pairs of training images. The parameter w is determined as the parameter that can maximize the likelihood that the probability in equation (4) correctly describes when two people from training pairs are the same person, and when two people from the training pairs are not the same person.

Similarity measurement module 157 inputs the training set of images (S355). In the training set of images, there are N pairs of images, with each pair of images being either a positive example or a negative example. A pair of person images is considered to be a positive example when the person images are from the same person and from the same day. Picture-taken-time information is used in deciding whether a pair of person images are from the same day. The face recognition and clothes recognition scores of these N pairs are given by $\{\overline{x}_1, \ldots, \overline{x}_i, \ldots, \overline{x}_N\}$, where $\overline{x}_i=[x_{i1},x_{i2},1]^T$ are the scores for the ith pair of training images, with $1 \leq i \leq N$. The ground truth of whether the ith pair is from the same person or not is denoted by $y_i$. Hence, $y=1$ means that the ith pair is from the same person, and $y_i=0$ means that the ith pair is not from the same person. Let $$f(\overline{x}_i) = \frac{1}{1+\exp(-w\overline{x}_i)}, \text{ then}$$

$$P(y_i|\overline{x}_i) = P(Y_i = y_i|\overline{x}_i) = (f(\overline{x}_i))^{y_i}(1-f(\overline{x}_i))^{1-y_i}$$

The parameter w to be used in the expression of $f(\overline{x}_i)$ is the one that can maximize the likelihood L that the probability in equation (4) correctly describes when two people from training pairs are the same person, assuming independence among pairs. The likelihood is calculated (S357) using the ground truth data (S365) and the picture-taken-time data (S367) of the training images:

$$L = \prod_i P(y_i|\overline{x}_i) = \prod_i (f(\overline{x}_i))^{y_i}(1-f(\overline{x}_i))^{1-y_i} \quad (6)$$

Then $$\log L = \sum_i (y_i \log f(\overline{x}_i) + (1-y_i)\log(1-f(\overline{x}_i)))$$

$$= \sum_i (y_i(-\log(1+\exp(-w\overline{x}_i))) + (1-y_i)(-w\overline{x}_i - \log(1+\exp(-w\overline{x}_i))))$$

$$= \sum_i ((y_i-1)w\overline{x}_i - \log(1+\exp(-w\overline{x}_i)))$$

The parameter w to be used in the expression of $f(\overline{x}_i)$ is the one that can maximize equation (6). Hence, the parameter w satisfies (S359):

$$\frac{\partial \log L}{\partial w} = \sum_i \left(y_i - \frac{1}{1+\exp(-w\overline{x}_i)}\right)\overline{x}_i = 0 \quad (7)$$

The solution of equation (7) can be obtained iteratively through Newton-Raphson's method (S361). The formula for iteratively updating w is:

$$w^{t+1} = w^t + (X^{T*}\theta p^{t*}X)^{-1}*X^{T*}(Y-f^t)$$

where $w^t$ is the estimation of w at iteration t; X is an N×3 matrix, where N is the total number of training examples (such as, for example, a pair of clothes images), with the ith row of X being $[x_{i1}, x_{i2}, 1]$; $X^t$ is the transpose of X; $fp^t$ is an N×N diagonal matrix with the ith diagonal element being $f(\overline{x}_i)*(1-f(\overline{x}_i))$, where $f(\overline{x}_i)$ is computed using $w^t$; Y is an N×1 column vector, with the ith element being $y_i$; $f^t$ is an N×1 column vector, with the ith element being $f(\overline{x}_i)$, computed using $w^t$. The procedure of iteratively determining w starts from an initial value $w^0$, and then iterates until convergence. At the end of the learning process, the w that can maximize the likelihood L is obtained. The w parameters are saved by similarity measurement module 157 (S363).

Figure 8:
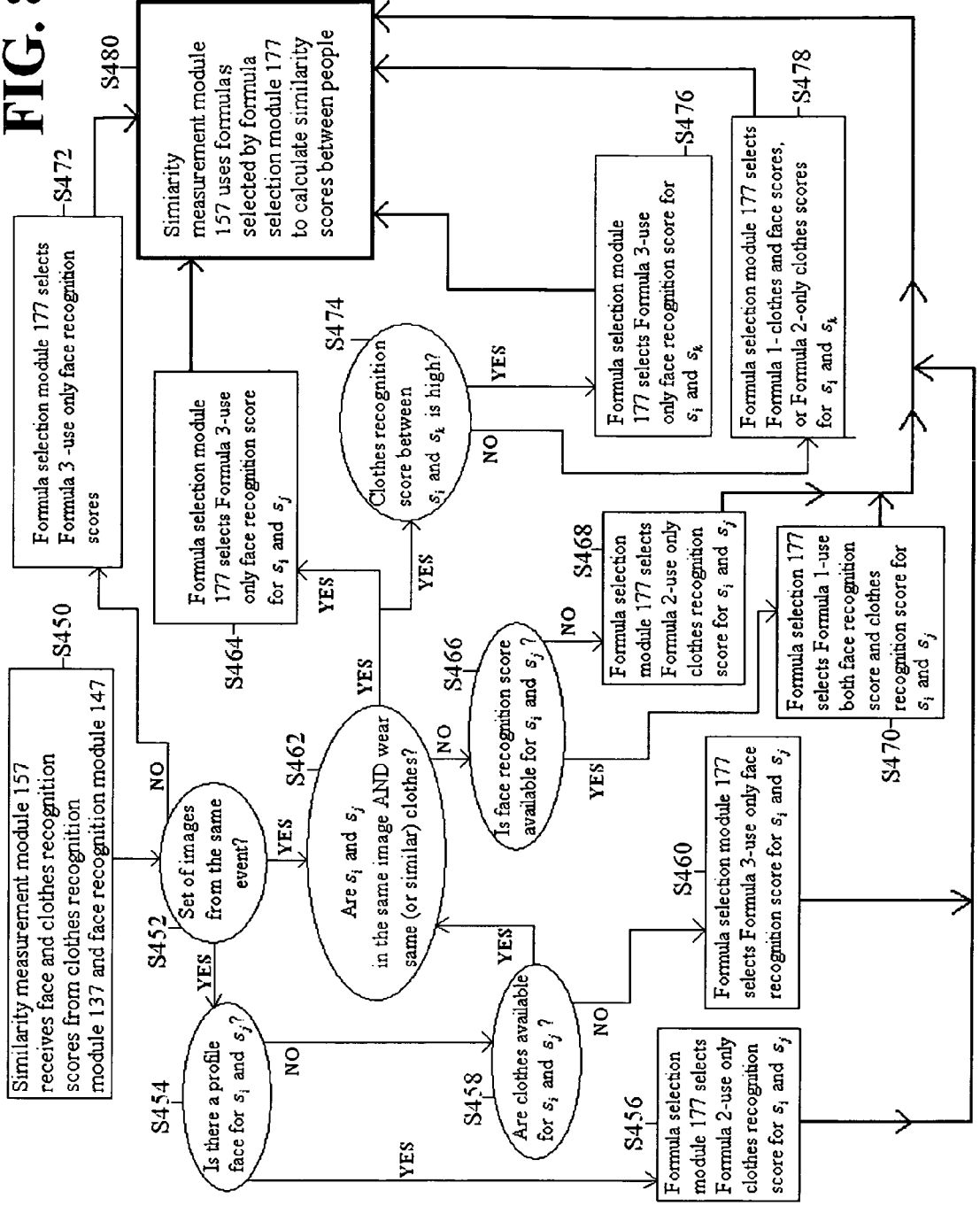
FIG. 8 is a flow diagram illustrating a technique for formula selection to obtain similarity measures for person images according to an embodiment of the present invention.

FIG. 8 is a flow diagram illustrating a technique for formula selection to obtain similarity measures for person images according to an embodiment of the present invention. The technique described in FIG. 8 can be used by formula selection module 177 to perform the formula selecting step S224 in FIG. 3.

As shown in FIG. 8, similarity measurement module 157 receives face and clothes recognition scores from clothes recognition module 137 and face recognition module 147 (S450). Similarity measurement module 157 sends information to formula selection module 177 regarding types of scores received, i.e. clothes or face scores, additional image context information such as picture-taken-time of images, implicit time or location information of images, image event recognition data, image tracking data such as a counter identifying the image, etc.

After receiving information from similarity measurement module 157, formula selection module 177 performs a test to determine whether images associated with the received scores are from the same event (S452). Images are from the same event if they were taken in the same time period which could be one day, half a day, etc., if they were taken at the same place, etc. If the images associated with the received scores are not from the same event, then people might not have worn the same clothes in all the images. Formula selection module 177 then selects Formula 3 for calculation of similarity scores between people (S472). Formula 3 uses only the face recognition score, while discarding the clothes recognition score.

If the images associated with the received scores are from the same event, clothes scores are relevant. Two person images $s_i$ and $s_j$ associated with received face or clothes scores are selected. Formula selection module 177 performs a test to determine if one of the faces of person images $s_i$ and $s_j$ is a profile face (S454). If the answer is yes, then the face similarity score between person images $s_i$ and $s_j$ is not usable, because profile faces typically do not give good face recognition scores. Formula selection module 177 then selects Formula 2 for calculation of similarity scores between $s_i$ and $s_j$ (S456). Formula 2 uses only the clothes recognition score, while discarding the face recognition score.

If faces of person images $s_i$ and $s_j$ are not profile faces, formula selection module 177 performs a test to determine if a clothes similarity score between $s_i$ and $s_j$ is available (S458). If a clothes similarity score is not available, formula selection module 177 then selects Formula 3 for calculation of similarity scores between $s_i$ and $s_j$, using only the face recognition score (S460).

If a clothes similarity score between $s_i$ and $s_j$ is available, formula selection module 177 performs a test to determine if person images $s_i$ and $s_j$ are from the same image and $s_i$ and $s_j$ wear the same or similar clothes (i.e., the clothes similarity score between $s_i$ and $s_j$ is high) (S462). People wearing the same (or similar) clothes represents a difficult case for incorporating clothes information. Two persons in one picture usually are not the same individual. Therefore if in one picture, two persons $s_i$ and $s_j$ wear the same (or similar) clothes, the clothes information needs to be discarded. Hence formula selection module 177 selects Formula 3 for calculation of similarity scores between $s_i$ and $s_j$, using only the face recognition score (S464).

Moreover, if the clothes similarity score between $s_i$ and a third person $s_k$ from any of the images ($s_k \neq s_j$) is high (S474), that is, the clothes of $s_k$ are very similar to the clothes of $s_i$ (and hence, also to the clothes of $s_j$), then the clothes similarity score for $s_i$ and $s_k$ is also treated as missing, because the clothes similarity score provides ambiguous information about $s_k$ (i.e., associates $s_k$ with both $s_i$ and $s_j$). In that case, formula selection module 177 selects Formula 3 for calculation of similarity scores between $s_i$ and $s_k$, using only the face recognition score (S476). In the same manner, if the clothes similarity score between $s_j$ and a third person $s_k$ ($s_k \neq s_i$) is high, that is the clothes of $s_k$ are very similar to the clothes of $s_j$ (and hence, also to the clothes of $s_i$), then the clothes similarity score for $s_j$ and $s_k$ is also treated as missing, and formula selection module 177 selects Formula 3 for calculation of similarity scores between $s_j$ and $s_k$, using only the face recognition score.

However, if the pair-wise clothes similarity between $s_i$ and another person image $s_k$ ($s_k \neq s_j$) located in any image from the set of images is not high, the clothes recognition score between $s_i$ and $s_k$ can be used, together with the face recognition score if available. Hence, formula selection module 177 selects Formula 1 or Formula 2 for calculation of similarity scores between $s_i$ and $s_k$ (S478), using either both face and clothes recognition scores, or only clothes recognition scores if face scores are not available. Similarly, if the pair-wise clothes similarity between $s_j$ and another person image $s_k$ ($s_k \neq s_i$) located in any image from the set of images is not high, the clothes recognition score between $s_j$ and $s_k$ can be used, together with the face recognition score between $s_j$ and $s_k$, if available.

If the result of the test in step S462 is negative, i.e., person images $s_i$ and $s_j$ are not from the same image or $s_i$ and $s_j$ do not wear the same or similar clothes, then the clothes score between $s_i$ and $s_j$ is usable. Formula selection module 177 then performs a test to determine if a face recognition score is available for $s_i$ and $s_j$ (S466). If the face recognition score is available, formula selection module 177 selects Formula 1 for calculation of similarity scores between $s_i$ and $s_j$ (S470). If the face recognition score is not available, formula selection module 177 selects Formula 2 for calculation of similarity scores between $s_i$ and $s_j$ (S468).

Step S462 may also be performed immediately after step S452.

Similarity measurement module 157 receives formulas selected by formula selection module 177 for each pair of person images, and uses the formulas to calculate similarity scores between persons in pairs of person images (S480).

Other cue combination algorithms, such as mixture of experts as in "Hierarchical Mixtures of Experts and the EM Algorithm", by M. I. Jordan and R. A. Jacobs, *Neural Computation*, 6: pp. 181-214, 1994, which is herein incorporated by reference, can be used with the formula selection method described in FIG. 8.

Figure 9:
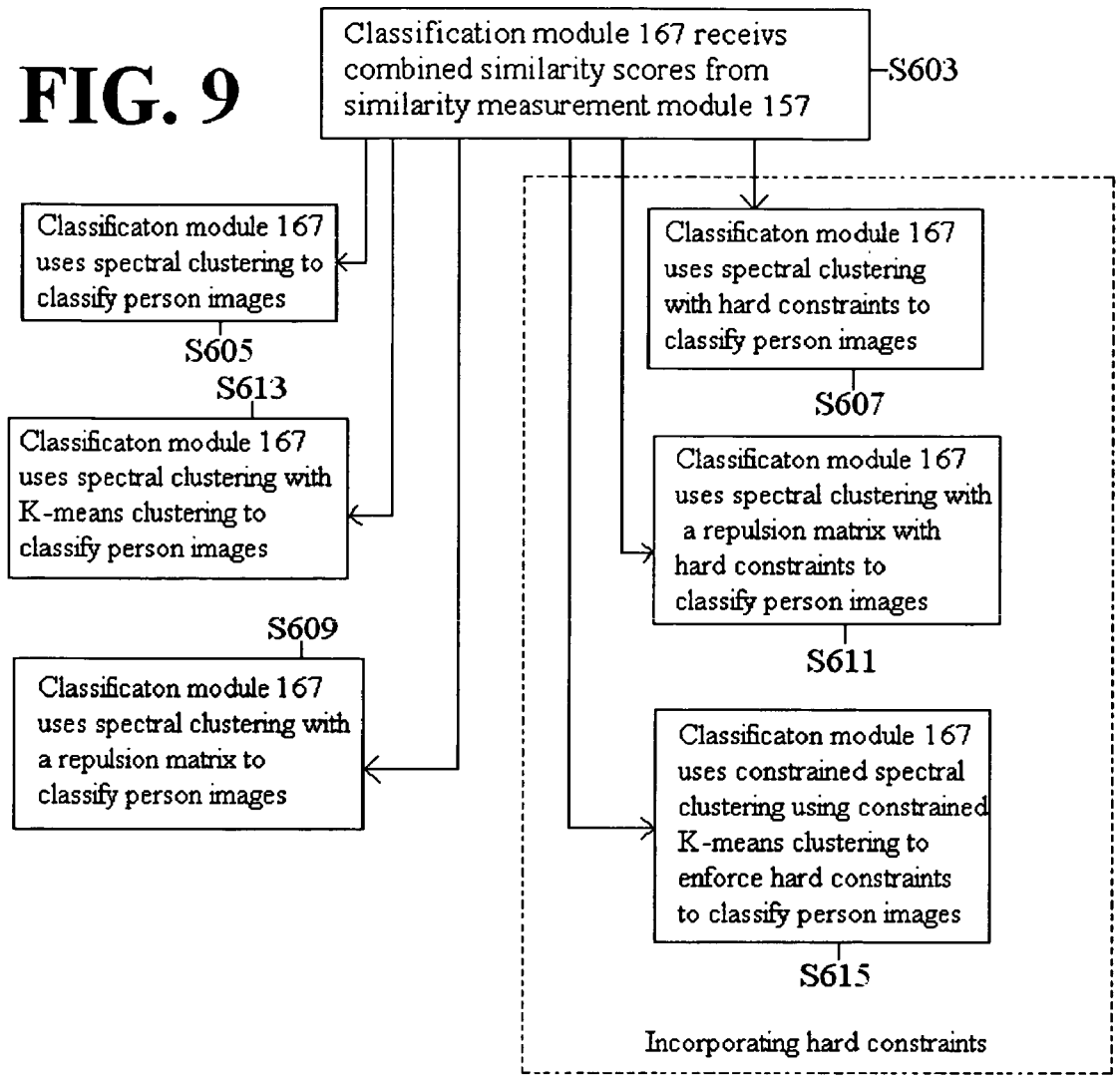
FIG. 9 is a flow diagram illustrating techniques for performing classification of person images based on person identities according to an embodiment of the present invention.

FIG. 9 is a flow diagram illustrating techniques for performing classification of person images based on person identities according to an embodiment of the present invention. The techniques described in FIG. 9 can be used by classification module 167 to classify images into groups according to the identities of the persons present in the images, in step S230 in FIG. 3. Methods that can be used to classify images into groups according to the identities of the persons present in the images include: spectral clustering; spectral clustering with hard constraints; spectral clustering using K-means clustering; spectral clustering using a repulsion matrix; spectral clustering using a repulsion matrix with hard constraints; constrained spectral clustering using constrained K-means clustering to enforce hard constraints. Detailed descriptions for the above mentioned clustering methods is found in the cross-referenced related US application titled "Method and Apparatus for Performing Constrained Spectral Clustering of Digital Image Data", the entire contents of which are hereby incorporated by reference.

Pair-wise combined similarity measurements obtained by similarity measurement module 157 provide grounds for clustering of people from images based on their identity, and hence, for clustering images according to the identities of the people shown in them.

Many clustering algorithms have been developed, from traditional K-means methods to the recent spectral clustering methods as described in "Normalized cuts and image segmentation", by J. Shi and J. Malik, in *Proc. CVPR, pages* 731-737, June 1997, "Segmentation using eigenvectors: a Unifying View", by Y. Weiss, in *Proc. ICCV,* 1999, "On spectral clustering: Analysis and an algorithm", by A. Y. Ng, M. I. Jordan, and Y. Weiss, in *NIPS* 14, 2002, and "Computational Models of Perceptual Organization", by Stella X. Yu, Ph.D. Thesis, Carnegie Mellon University, 2003, CMU-RI-TR-03-14, these publications being herein incorporated by reference. One major advantage of spectral clustering methods over K-means methods is that K-means methods can easily fail when clusters do not correspond to convex regions. The same is the case for mixture of models using EM, which often assume that the density of each cluster is Gaussian. In human clustering, imaging conditions can change in various aspects, leading to cluster that do not necessarily form a convex region. Therefore a spectral clustering algorithm is favored for human clustering in the present application.

Spectral clustering methods cluster points by eigenvalues and eigenvectors of a matrix derived from the pair-wise similarities between points. Spectral clustering methods do not assume global structures, so these methods can handle non-convex clusters. Spectral clustering is similar to graph partitioning: each point is a node in the graph and similarity between two points gives the weight of the edge between those points. In human clustering, each point is a person's image, and similarity measurements are probabilities of same identity derived from face and/or clothes recognition scores.

One effective spectral clustering method used in computer vision is the method of normalized cuts, as described in "Normalized Cuts and Image Segmentation", by J. Shi and J. Malik, in *Proc. CVPR, pages* 731-737, June 1997, which is herein incorporated by reference. The normalized cuts method from the above publication may be used by classification module 167 to perform spectral clustering classification in step S605. The normalized cuts method from the above publication is generalized in "Computational Models of Perceptual Organization", by Stella X. Yu, Ph.D. Thesis, Carnegie Mellon University, 2003, CMU-RI-TR-03-14, which is herein incorporated by reference.

The normalized cuts criterion maximizes links (similarities) within each cluster and minimizes links between clusters. Suppose a set of points $S=\{s_1,\ldots,s_N\}$ is to be clustered into K clusters. Let W be the N×N weight matrix, with term $W_{ij}$ being the similarity between points $s_i$ and $s_j$. Let D denote the diagonal matrix with the $i^{th}$ diagonal element being the sum of W's $i^{th}$ row (i.e. the degree for the $i^{th}$ node). The clustering results can be represented by a N×K partition matrix X, with $X_{ik}=1$ if and only if point $s_i$ belongs to the $k^{th}$ cluster, and 0 otherwise. Let $X_l$ denote the $l^{th}$ column vector of X, $1 \leq l \leq K$. $X_l$ is the membership indicator vector for the $l^{th}$ cluster. Using these notations, the normalized cut criterion finds the best partition matrix X* which can maximize $$\varepsilon(X) = \frac{1}{K} \sum_{l=1}^{K} \frac{X_l^T W X_l}{X_l^T D X_l} \qquad (8)$$

Relaxing the binary partition matrix constraint on X and using Rayleigh-Ritz theorem, it can be shown that the optimal solution in the continuous domain is derived through the K largest eigenvectors of $D^{-1/2}WD^{-1/2}$. Let $v_i$ be the $i^{th}$ largest eigenvector of $D^{-1/2}WD^{-1/2}$, and $V^K=[v_1,v_2,\ldots,v_K]$. Then the continuous optimum of $\varepsilon(X)$ can be achieved by $X^*_{conti}$, the row normalized version of $V^K$ (each row of $X^*_{conti}$ has unit length). In fact, the optimal solution is not unique—the optima are a set of matrices up to an orthonormal transformation: $\{X^*_{conti}O : O^T O = I_K\}$ where $I_K$ is the K×K identity matrix.

Hence, for the operation of classification module 167 in steps S605 and S613 in FIG. 9, suppose a set of points $S=\{s_1,\ldots,s_N\}$ is input into classification module 167, where each point $s_i$ for $1 \leq i \leq N$ is an image of a person (may include face or clothes or both) from the images from the set of images. Thus, if image I1 shows 3 people, image I1 contributes with $s_1$, $s_2$ and $s_3$ to the set S. If image I2 shows 2 people, image I2 contributes with $s_4$ and $s_5$ to the set S. And so on. The points $s_1,s_2,\ldots,s_N$ are to be clustered into K clusters, with each cluster corresponding to one identity among K identities of people found in the images. The similarity between two points can be computed from face recognition and/or clothes recognition results by similarity measurement module 157. From these similarity measurements, the N by N affinity matrix A is formed, with each term $A_{ij}$ being the similarity score between $s_i$ and $s_j$ for $i \neq j$, and $A_{ii}=0$ for the diagonal terms. Classification module 167 then defines D as the diagonal matrix whose $i^{th}$ diagonal element is the sum of A's $i^{th}$ row. Classification module 167 then constructs the matrix $L=D^{-1/2}AD^{-1/2}$, finds the K largest eigenvectors of L, and forms the matrix X by stacking these eigenvectors in columns. Classification module 167 then forms the matrix Y by re-normalizing each of X's rows to have unit length. Treating each row of Y as a point, classification module 167 clusters the rows of Y via K-means (S613) or other algorithms (S605). Finally, classification module 167 assigns each point $s_i$ to cluster j if the $i^{th}$ row of Y is assigned to cluster j.

The set of eigenvalues of a matrix is called its spectrum. The algorithm described for steps S605 and S613 makes use of the eigenvalues and eigenvectors of the data's affinity matrix, so it is a spectral clustering algorithm. The algorithm essentially transforms the data to a new space so that data are better clustered in the new space.

In the publication "Computational Models of Perceptual Organization", by Stella X. Yu, Ph.D. Thesis, Carnegie Mellon University, 2003, CMU-RI-TR-03-14, which is herein incorporated by reference, a repulsion matrix is introduced to model the dissimilarities between points. Such a clustering algorithm may be used in step S609. The clustering goal becomes to maximize within-cluster similarities and between cluster dissimilarities, but to minimize their compliments. Suppose a set of points $S=\{s_1,\ldots,s_N\}$ needs to be clustered into K clusters, where each point $s_k$ is an image of a person.

Let A be the matrix quantifying similarities (affinity matrix), R be the matrix representing dissimilarities (repulsion matrix), and $D_A$ and $D_R$ be the diagonal matrices corresponding to the row sum of A and R respectively. Define $$\hat{W} = A - R + D_R \quad (9)$$

and $$\hat{D} = D_A + D_R. \quad (10)$$

The goal is then to find the partition matrix X that can maximize:

$$\frac{1}{K} \sum_{l=1}^{K} \frac{X_l^T \hat{W} X_l}{X_l^T \hat{D} X_l}. \quad (11)$$

The continuous optima can be found through the K largest eigenvectors of $\hat{D}^{-1/2}\hat{W}\hat{D}^{-1/2}$ in a fashion similar to the case without a repulsion matrix.

Since a continuous solution can be found by solving eigensystems, the above method using an affinity matrix and a repulsion matrix is fast and can achieve a global optimum in the continuous domain. However, for clustering, a continuous solution needs to be discretized. In "Computational Models of Perceptual Organization", by Stella X. Yu, Ph.D. Thesis, Carnegie Mellon University, 2003, CMU-RI-TR-03-14, discretization is done iteratively to find the binary partition matrix $X^*_{discrete}$ which can minimize $\|X_{discrete} - X^*_{conti} O\|^2$, where $\|M\|$ is the Frobenius norm of matrix M: $\|M\| = \sqrt{tr(MM^T)}$, O is any orthonormal matrix, and $X^*_{conti} O$ is a continuous optimum. The discretization performed to find the binary partition matrix $X^*_{discrete}$ completes step S609.

Classification module 167 may also cluster pictures according to each person's identity utilizing context information. Similarity computation between two points (two person images) is important in the clustering process. Besides faces and clothes in images, there may exist additional cues that can be incorporated and utilized to improve human recognition. Logic-based constraints represent additional cues that can help in clustering people in images based on identities. Logic-based context and constraints represent knowledge that can be obtained from common logics, such as the constraint that different faces in one picture belong to different individuals, or the constraint that husband and wife are more likely to be pictured together. Some logic-based constraints are hard constraints. For example, the constraint that different faces in one picture belong to different individuals is a negative hard constraint. Other logic-based constraints are soft constraints, such as the constraint that husband and wife are more likely to be pictured together. Another useful positive soft constraint is prior knowledge that a person is present in a group of images. Hence, the constraint that a face must belong to person A is a hard constraint. On the other hand, the fact that the probability of a face belonging to person A is 0.8, is a soft constraint.

Hence, classification module 167 can improve human clustering results by using more context cues through incorporation into the clustering method of logic-based contexts that can be expressed as hard constraints. To make use of such hard constraints, the clustering approaches of steps S605, S609 and S613 are modified in steps S607, S611 and S615 by incorporating hard constraints.

It is desirable to be able to enforce such hard constraints in human clustering. However, incorporating priors (such as hard constraints) poses a challenge for spectral clustering algorithms. In "Computational Models of Perceptual Organization", by Stella X. Yu, Ph.D. Thesis, Carnegie Mellon University, 2003, CMU-RI-TR-03-14, and "Grouping with Bias", by S. X. Yu and J. Shi, in NIPS, 2001, a method to impose positive constraints (two points must belong to the same cluster) was proposed, but there is no guarantee that the positive constraints will be respected as the constraints may be violated in the discretization step. Classification module 167 may perform clustering of person images using an affinity matrix with positive hard constraints in step S607. Negative hard constraints may also be incorporated in an affinity matrix in step S607.

In step S611, classification module 167 implements a clustering approach using a repulsion matrix with hard constraints. Using the notations introduced for the clustering methods described by equations (9), (10) and (11), let $S = \{s_1, \ldots, s_N\}$ be the set of points associated with person images from all the images from the set of images. The points $s_1, s_2, \ldots, s_N$ are to be to be clustered into K clusters, with each cluster corresponding to one identity among all K identities of people found in the images. The pair-wise similarity between two points $s_i$ and $s_j$ is obtained from face and/or clothes recognition scores and other context cues. The similarity values for pairs of person images were calculated by similarity measurement module 157 as probabilities for pairs of people to represent the same person. Using the similarity measurements associated with pairs of person images, classification module 167 forms an N by N affinity matrix A, with each term $A_{ij}$ being the probability similarity score between $s_i$ and $s_j$ for $i \neq j$, and $A_{ij} = 0$ for $i = j$, that is $A_{ii} = 0$ for the diagonal terms of matrix A.

Suppose $s_i$ and $s_j$ are two person images that are found in the same picture. In this case, the two persons are typically different people (have different identities), so the classification module 167 should place $s_i$ and $s_j$ in different clusters. To embed this constraint, the term $A_{ij}$ in the affinity matrix A corresponding to the similarity between $s_i$ and $s_j$ is set to zero, $A_{ij} = 0$.

To enhance hard negative constraints, a repulsion matrix R is generated, to describe how dissimilar the two points $s_i$ and $s_j$ are. If $s_i$ and $s_j$ are two person images that are found in the same picture and therefore represent different people, the term $R_{ij}$ is set to be 1. More generally, the term $R_{ij}$ is set to be 1 if $s_i$ and $s_j$ cannot be in the same cluster. If there are no known constraints between two points $s_i$ and $s_j$, then the corresponding term $R_{ij}$ is set to be zero. Classification module 167 then performs spectral clustering with a repulsion matrix with hard constraints (S611). A detailed description of the clustering method using a repulsing matrix with hard constraints for step S611 is found in the cross-referenced related US application titled "Method and Apparatus for Performing Constrained Spectral Clustering of Digital Image Data", the entire contents of which are hereby incorporated by reference.

Classification module 167 may also classify person images using constrained spectral clustering with constrained K-means clustering to enforce hard constraints to cluster images based on the identities of the people in the images (S615).

Although spectral clustering methods are more advantageous than K-means methods because K-means methods can easily fail when clusters do not correspond to convex regions, it is difficult to enforce hard constraints in spectral clustering methods. Introducing hard constraints in the affinity matrix A and in the repulsion matrix R may not be enough for enforcing these constraints, because there is no guarantee that the hard constraints are satisfied during the clustering step. Constrained K-means clustering is performed to ensure that the hard constraints are satisfied.

A constrained K-means algorithm that integrates hard constraints into K-means clustering is presented in "Constrained K-Means Clustering with Background Knowledge", by K. Wagstaff, C. Cardie, S. Rogers, and S. Schroedl, in *Proc. 18th International Conference on Machine Learning ICML*, 2001, pp. 577-584, which is herein incorporated by reference. In the publication "On Spectral Clustering: Analysis and an Algorithm", by A. Y. Ng, M. I. Jordan, and Y. Weiss, in *NIPS* 14, 2002, which is herein incorporated by reference, K-means was used in the discretization step. However, in this publication, a repulsion matrix was not used, the use of K-means with a repulsion matrix was not justified, the regular K-means instead of constrained K-means was used, and therefore no constraints were imposed.

In the current application, a constrained K-means algorithm is implemented in the discretization step to enforce hard constraints for human clustering in images. The constrained K-means algorithm may use methods described in publication "Contrained K-Means Clustering with Background Knowledge", by K. Wagstaff, C. Cardie, S. Rogers, and S. Schroedl, in *Proc. 18th International Conference on Machine Learning ICML*, 2001, pp. 577-584, which is herein incorporated by reference.

Let $S=\{s_1, \ldots, s_N\}$ be the set of points associated with person images from all the images from the set of images. The points $s_1, s_2, \ldots, s_N$ are to be to be clustered into K clusters, with each cluster corresponding to one identity among all K identities of people found in the images. As before, an affinity matrix A is generated, with each term $A_{ij}$ being the probability similarity score between $s_i$ and $s_j$ for $i \neq j$, and $A_{ij}=0$ for $i=j$, that is $A_{ii}=0$ for the diagonal terms of matrix A. Classification module 167 also generates a repulsion matrix R to describe how dissimilar the two points $s_i$ and $s_j$ are.

Classification module 167 next embeds hard negative constraints in the affinity matrix A, by making $A_{ij}=0$ when $s_i$ and $s_j$ are known to belong to different clusters (represent different people). Classification module 167 may also embed hard positive constraints as well in the affinity matrix A, if positive constraints are available. An example of a positive constraint is the constraint that a person appears in consecutive pictures. For example, if it is known that two person images $s_i$ and $s_j$ in two images belong to the same individual, the algorithm can enforce such positive constraints by setting the term $A_{ij}=1$ in the affinity matrix A, and the term $R_{ij}=0$ in the repulsion matrix R. Such a hard positive constraint may be available from users' feedback, when an indication is received from a user of the application pinpointing a number of images in which a person appears. To embed hard negative constraints, the term $R_{ij}$ is set to be 1 if $s_i$ and $s_j$ cannot be in the same cluster (cannot represent different people). Classification module 167 may embed hard positive constraints as well in the repulsion matrix R, if positive constraints are available.

Classification module 167 then performs constrained spectral clustering using constrained K-means clustering to enforce hard constraints (S615). Other constrained clustering methods to enforce hard constraints may also be used. A detailed description of the constrained spectral clustering methods that enforce hard constraints in step S615 is found in the cross-referenced related US application titled "Method and Apparatus for Performing Constrained Spectral Clustering of Digital Image Data", the entire contents of which are hereby incorporated by reference.

The current application describes a method and an apparatus for adaptive context-aided human identification and classification. The method and apparatus use face information, clothes information, and other available context information (such as the fact that people in one picture should be different individuals) to perform identification of people in images. The method and apparatus presented in the current application achieve a number of results. The method and apparatus presented in the current application implement a formula selection method to obtain similarity scores between persons in images based on availability of face and clothes similarity scores. The method and apparatus presented in the current application utilize face and clothes information, picture record data such as time (implicitly), and other context information, such as that persons from one picture should be in different clusters. The method and apparatus presented in the current application are able to handle cases when face or clothes information is missing, by computing proper marginal probabilities. As a result, the method and apparatus are still effective on profile faces where only clothes recognition results are available, or when the clothes are occluded and face information is available. The method and apparatus in the current application are also able to handle cases when different people found in the same image wear the same (or similar) clothes.

Although the detailed embodiments described in the present application relate to human recognition and classification using face and clothes information, principles of the present invention may also be applied to other types of objects that can be described by multiple features in images.

Although detailed embodiments and implementations of the present invention have been described above, it should be apparent that various modifications are possible without departing from the spirit and scope of the present invention.

We claim:

1. A digital image processing method, said method comprising: accessing digital data representing a plurality of digital images including a plurality of persons; performing face recognition to determine first scores relating to similarity between faces of said plurality of persons; performing clothes recognition to determine second scores relating to similarity between clothes of said plurality of persons; providing a plurality of formulas for estimating a probability of a face from said faces and a clothes from said clothes to belong to a person from said plurality of persons, wherein at least one formula of said plurality of formulas utilizes a first score and a second score, and at least one formula of said plurality of formulas utilizes only one score of a first score and a second score while one of said first and second scores depends on the other of said first and second scores; and selecting a formula from said plurality of formulas based on availability of a first score from said first scores for two persons from said plurality of persons, and availability of a second score from said second scores for said two persons, said selected formula estimating a probability relating to similarity of identities of said two persons.

2. The digital image processing method as recited in claim 1, wherein said clothes of said plurality of persons include at least one of clothing, shoes, watch, and eyeglasses.

3. The digital image processing method as recited in claim 1, wherein said selecting step includes selecting a formula from said plurality of formulas based on a time when digital images associated with said two persons were taken.

4. The digital image processing method as recited in claim 1, wherein said selecting step includes selecting a formula from said plurality of formulas based on a place where digital images associated with said two persons were taken.

5. The digital image processing method as recited in claim 1, wherein said selecting step includes selecting a formula from said plurality of formulas based on whether said two persons are associated with the same image from said plurality of digital images and said two persons are wearing similar clothes.

6. The digital image processing method as recited in claim 1, wherein said selecting step includes selecting a formula from said plurality of formulas when a first score for said two persons is not available.

7. The digital image processing method as recited in claim 1, wherein said selecting step includes selecting a formula from said plurality of formulas when a first score and a second score for said two persons are available.

8. The digital image processing method as recited in claim 1, wherein said plurality of formulas are derived using logistic regression.

9. The digital image processing method as recited in claim 8, wherein said step of providing a plurality of formulas includes learning parameters for said plurality of formulas using logistic regression.

10. The digital image processing method as recited in claim 1, wherein said step of performing clothes recognition includes
    detecting clothes regions below faces of said plurality of persons,
    segmenting clothes regions by maximizing a difference between said clothes regions to determine clothes areas, and
    removing clutters not belonging to said clothes areas.

11. The digital image processing method as recited in claim 10, wherein said step of performing clothes recognition further includes performing clothes feature extraction for said clothes areas by
    extracting representative image patches from said clothes areas,
    quantizing said representative image patches using vector quantization to obtain patch vectors,
    clustering said patch vectors to obtain patch clusters and code-words as centers of said patch clusters, and
    representing said clothes areas by code-word feature vectors of frequencies of appearance of said code-words in said clothes areas.

12. The digital image processing method as recited in claim 11, wherein said step of performing clothes recognition further includes
    weighting said code-word feature vectors such that higher priorities are given to code-words occurring less frequently, and
    calculating said second scores as a scalar product of said weighted code-word feature vectors for clothes areas pairs from said clothes areas.

13. The digital image processing method as recited in claim 1, wherein said selecting step is performed for a plurality of pairs of persons from said plurality of persons, to estimate a plurality of probabilities relating to similarities of identities of persons in said plurality of pairs.

14. The digital image processing method as recited in claim 13, further comprising: clustering said plurality of persons using said plurality of probabilities to obtain clusters relating to identities of persons from said plurality of persons.

15. The digital image processing method as recited in claim 13, further comprising:
    performing a spectral analysis to obtain eigenvector results from an arrangement of said plurality of probabilities, and
    performing discretization of said eigenvector results by clustering said eigenvector results to obtain clusters relating to identities of persons from said plurality of persons.

16. The digital image processing method as recited in claim 13, further comprising:
    incorporating in an arrangement of said plurality of probabilities at least one hard constraint relating to persons from said plurality of persons, to obtain constrained inter-relational data results,
    performing a spectral analysis to obtain eigenvector results from said constrained inter-relational data results, and
    performing discretization of said eigenvector results by clustering said eigenvector results to obtain clusters relating to identities of persons from said plurality of persons.

17. The digital image processing method as recited in claim 13, further comprising:
    incorporating in an arrangement of said plurality of probabilities at least one hard constraint relating to persons from said plurality of persons, to obtain constrained inter-relational data results,
    performing a spectral analysis to obtain eigenvector results from said constrained inter-relational data results, and
    performing discretization of said eigenvector results using constrained clustering with a criterion to enforce said at least one hard constraint to obtain clusters relating to identities of persons from said plurality of persons.

18. The digital image processing method as recited in claim 17, wherein said sub-step of performing discretization uses constrained K-means clustering.

19. The digital image processing method as recited in claim 18, wherein said at least one hard constraint includes a hard negative constraint that two persons found in the same image from said plurality of digital images have different identities.

20. The digital image processing method as recited in claim 18, wherein said at least one hard constraint includes a positive constraint based on predetermined knowledge that two persons found in different images from said plurality of digital images are the same person.

21. A digital image processing apparatus, said apparatus comprising: an image data unit for providing digital data representing a plurality of digital images including a plurality of persons; a face recognition unit for determining first scores relating to similarity between faces of said plurality of persons; a clothes recognition unit for determining second scores relating to similarity between clothes of said plurality of persons; and a formula selection unit for providing a plurality of formulas to estimate a probability of a face from said faces and a clothes from said clothes to belong to a person from said plurality of persons, wherein at least one formula of said plurality of formulas utilizes a first score and a second score, and at least one formula of said plurality of formulas utilizes only one score of a first score and a second score while one of said first and second scores depends on the other of said first and second scores, and selecting a formula from said plurality of formulas based on availability of a first score from said first scores for two persons from said plurality of persons, and availability of a second score from said second scores for said two persons, said selected formula estimating a probability relating to similarity of identities of said two persons.

22. The apparatus according to claim 21, wherein said clothes of said plurality of persons include at least one of clothing, shoes, watch, and eyeglasses.

23. The apparatus according to claim 21, wherein said formula selection unit selects a formula from said plurality of formulas based on a time when digital images associated with said two persons were taken.

24. The apparatus according to claim 21, wherein said formula selection unit selects a formula from said plurality of formulas based on a place where digital images associated with said two persons were taken.

25. The apparatus according to claim 21, wherein said formula selection unit selects a formula from said plurality of formulas based on whether said two persons are associated with the same image from said plurality of digital images and said two persons are wearing similar clothes.

26. The apparatus according to claim 21, wherein said formula selection unit selects a formula from said plurality of formulas when a first score for said two persons is not available.

27. The apparatus according to claim 21, wherein said formula selection unit selects a formula from said plurality of formulas when a first score and a second score for said two persons are available.

28. The apparatus according to claim 21, wherein said plurality of formulas are derived using logistic regression.

29. The apparatus according to claim 28, further comprising:
a similarity measurement unit for learning parameters for said plurality of formulas using logistic regression.

30. The apparatus according to claim 21, wherein said clothes recognition unit performs clothes recognition by
detecting clothes regions below faces of said plurality of persons,
segmenting clothes regions by maximizing a difference between said clothes regions to determine clothes areas, and
removing clutters not belonging to said clothes areas.

31. The apparatus according to claim 30, wherein said clothes recognition unit performs clothes feature extraction for said clothes areas by
extracting representative image patches from said clothes areas,
quantizing said representative image patches using vector quantization to obtain patch vectors,
clustering said patch vectors to obtain patch clusters and code-words as centers of said patch clusters, and
representing said clothes areas by code-word feature vectors of frequencies of appearance of said code-words in said clothes areas.

32. The apparatus according to claim 31, wherein said clothes recognition unit determines said second scores by
weighting said code-word feature vectors such that higher priorities are given to code-words occurring less frequently, and
calculating said second scores as a scalar product of said weighted code-word feature vectors for clothes areas pairs from said clothes areas.

33. The apparatus according to claim 21, further including a similarity measurement unit, wherein
said formula selection unit selects formulas from said plurality of formulas for a plurality of pairs of persons from said plurality of persons, and
said similarity measurement unit estimates a plurality of probabilities relating to similarities of identities of persons in said plurality of pairs.

34. The apparatus according to claim 33, further comprising:
a classification unit for clustering said plurality of persons using said plurality of probabilities to obtain clusters relating to identities of persons from said plurality of persons.

35. The apparatus according to claim 33, further comprising a classification unit for
performing a spectral analysis to obtain eigenvector results from an arrangement of said plurality of probabilities, and
performing discretization of said eigenvector results by clustering said eigenvector results to obtain clusters relating to identities of persons from said plurality of persons.

36. The apparatus according to claim 33, further comprising a classification unit for
incorporating in an arrangement of said plurality of probabilities at least one hard constraint relating to persons from said plurality of persons, to obtain constrained inter-relational data results,
performing a spectral analysis to obtain eigenvector results from said constrained inter-relational data results, and
performing discretization of said eigenvector results by clustering said eigenvector results to obtain clusters relating to identities of persons from said plurality of persons.

37. The apparatus according to claim 33, further comprising a classification unit for
incorporating in an arrangement of said plurality of probabilities at least one hard constraint relating to persons from said plurality of persons, to obtain constrained inter-relational data results,
performing a spectral analysis to obtain eigenvector results from said constrained inter-relational data results, and
performing discretization of said eigenvector results using constrained clustering with a criterion to enforce said at least one hard constraint to obtain clusters relating to identities of persons from said plurality of persons.

38. The apparatus according to claim 37, wherein said classification unit performs discretization using constrained K-means clustering.

39. The apparatus according to claim 38, wherein said at least one hard constraint includes a hard negative constraint that two persons found in the same image from said plurality of digital images have different identities.

40. The apparatus according to claim 38, wherein said at least one hard constraint includes a positive constraint based on predetermined knowledge that two persons found in different images from said plurality of digital images are the same person.

* * * * *